US012745054B2

(12) United States Patent
Zeng

(10) Patent No.: US 12,745,054 B2
(45) Date of Patent: Sep. 22, 2026

(54) METHOD AND DEVICE OF ACTIVE NOISE REDUCTION FOR EARPHONE, EARPHONE, AND COMPUTER READABLE STORAGE MEDIUM

(71) Applicant: GOERTEK TECHNOLOGY CO., LTD., Qingdao (CN)

(72) Inventor: Kai Zeng, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 134 days.

(21) Appl. No.: 18/659,378

(22) Filed: May 9, 2024

(65) Prior Publication Data

US 2024/0292176 A1 Aug. 29, 2024

Related U.S. Application Data

(63) Continuation of application No. PCT/CN2021/138984, filed on Dec. 17, 2021.

(30) Foreign Application Priority Data

Nov. 29, 2021 (CN) ........................ 202111436462.4

(51) Int. Cl.
*H04R 1/10* (2026.01)
*H04S 7/00* (2006.01)

(52) U.S. Cl.
CPC ........... *H04S 7/304* (2013.01); *H04R 1/1083* (2013.01); *H04R 2460/01* (2013.01)

(58) Field of Classification Search
CPC ........ H04S 7/304; H04S 1/1016; Y02D 30/70
See application file for complete search history.

(56) References Cited

U.S. PATENT DOCUMENTS 12,302,057 B1 * 5/2025 Chen .................... H04R 1/1016
2015/0243271 A1 8/2015 Goldstein
2017/0171657 A1 6/2017 Liu et al.
2018/0122357 A1 5/2018 Thornock et al.
(Continued)

FOREIGN PATENT DOCUMENTS

CN 110972014 A 4/2020
CN 111163391 A 5/2020
CN 111800687 A 10/2020
(Continued)

OTHER PUBLICATIONS

Machine translation of CN110972014, 34 pages (Year: 2020).*
(Continued)

*Primary Examiner* — Ping Lee
(74) *Attorney, Agent, or Firm* — HAUPTMAN HAM, LLP

(57) ABSTRACT

Disclosed are a method and a device of active noise reduction for an earphone, an active noise reduction earphone, and a computer readable storage medium. The method of active noise reduction for the earphone includes the following steps: obtaining wearing posture change information of the earphone relative to a wearer; determining whether to adjust a current active noise reduction parameter according to the wearing posture change information; and in response to that the current active noise reduction parameters is adjusted, performing a preset adjustment operation on the current active noise reduction parameter.

6 Claims, 5 Drawing Sheets

(56) References Cited

U.S. PATENT DOCUMENTS

2021/0342032 A1* 11/2021 Guo ...................... G06F 3/0443

FOREIGN PATENT DOCUMENTS

| | | | |
|---|---|---|---|
| CN | 111988690 | A | 11/2020 |
| CN | 112468924 | A | 3/2021 |
| CN | 112804607 | A | 5/2021 |
| CN | 113613157 | A | 11/2021 |
| CN | 113676804 | A | 11/2021 |

OTHER PUBLICATIONS

First Office Action in Corresponding Chinese Application No. 202111436462.4, dated Jun. 1, 2022; 14 pgs.
Grant Notification in Corresponding Chinese Application No. 202111436462.4, dated Mar. 12, 2023; 3 pgs.
International Search Report and Written Opinion in Corresponding International Application No. PCT/CN2021/138984, mailed Aug. 1, 2022; 13 pgs.
Second Office Action in Corresponding Chinese Application No. 202111436462.4, dated Dec. 16, 2022; 17 pgs.

* cited by examiner

METHOD AND DEVICE OF ACTIVE NOISE REDUCTION FOR EARPHONE, EARPHONE, AND COMPUTER READABLE STORAGE MEDIUM

CROSS-REFERENCE TO RELATED APPLICATIONS

The present application is a continuation application of International Application No. PCT/CN2021/138984, filed on Dec. 17, 2021, which claims priority to Chinese patent application No. 202111436462.4, entitled in "METHOD AND DEVICE OF ACTIVE NOISE REDUCTION FOR EARPHONE, EARPHONE, AND COMPUTER READABLE STORAGE MEDIUM" and filed on Nov. 29, 2021. The disclosures of the above-mentioned applications are incorporated herein by reference in their entireties.

TECHNICAL FIELD

The present application relates to the technical field of earphone active noise reduction, and in particular to a method and a device of active noise reduction for an earphone, an earphone, and a computer readable storage medium.

BACKGROUND

Noise reduction earphones can reduce environmental noise and improve the listening experience of users. Therefore, noise reduction earphones are increasingly favored by consumers. At present, the active noise reduction earphones on the market mainly perform active noise reduction in the middle and low frequency bands of the audio signal. The noise signal received by the microphone generates a noise reduction signal with the opposite phase/same frequency band/same amplitude as the external noise through analog circuit/digital circuit. The speaker receives the noise reduction signal and emits a noise reduction wave to superimpose and cancel the external noise, so as to achieve the effect of active noise reduction. However, in actual use, the fit between the earphone and the user's ear canal will change due to the difference in the user's wearing tightness and/or the difference in the user's activity state (such as running, lying down or jumping, etc.). As a result, the noise reduction effect of the earphones is poor.

The above content is only configured to assist in understanding the technical solution of the present application, and does not mean that the above content is admitted as prior art.

SUMMARY

The main purpose of the present application is to provide a method of active noise reduction for an earphone, aiming to solve the technical problem of poor noise reduction effect due to changes in fit between the earphone and the user's ear canal.

In order to achieve the above purpose, the present application provides a method of active noise reduction for an earphone, including:

obtaining wearing posture change information of the earphone relative to a wearer;

determining whether to adjust a current active noise reduction parameter according to the wearing posture change information; and in response to that the current active noise reduction parameters is adjusted, performing a preset adjustment operation on the current active noise reduction parameter.

In an embodiment, the wearing posture change information includes reference capacitance information and real-time capacitance information;

the determining whether to adjust the current active noise reduction parameter according to the wearing posture change information includes:

determining whether the reference capacitance information is consistent with the real-time capacitance information; and in response to that the reference capacitance information is not consistent with the real-time capacitance information, adjusting the current active noise reduction parameter.

In an embodiment, the reference capacitance information includes a reference capacitance value, and the real-time capacitance information includes a real-time capacitance value;

the determining whether the reference capacitance information is consistent with the real-time capacitance information includes:

determining whether the reference capacitance value and the real-time capacitance value are in a same preset capacitance range;

in response to that the reference capacitance value and the real-time capacitance value are in the same preset capacitance range, determining that the reference capacitance information is consistent with the real-time capacitance information; and in response to that the reference capacitance value and the real-time capacitance value are not in the same preset capacitance range, determining that the reference capacitance information is inconsistent with the real-time capacitance information.

In an embodiment, the performing the preset adjustment operation on the current active noise reduction parameter includes:

obtaining acoustic leakage information; and adjusting the current active noise reduction parameter according to the acoustic leakage information.

In an embodiment, the obtaining the acoustic leakage information includes:

obtaining first audio information, and obtaining second audio information after the first audio information is propagated, the first audio information is formed by superposition of acoustic signals in a preset frequency band; and generating the acoustic leakage information according to the first audio information and the second audio information.

In an embodiment, the acoustic leakage information includes an amplitude loss and/or a displacement of the acoustic signal in a preset frequency band;

the adjusting the current active noise reduction parameter according to the acoustic leakage information includes:

obtaining compensation information for the acoustic signal in the preset frequency band according to the amplitude loss and/or the displacement of the acoustic signal in the preset frequency band; and adjusting the current active noise reduction parameter to compensate the acoustic signal in the preset frequency band according to the compensation information.

In an embodiment, the in response to that the current active noise reduction parameters is adjusted, performing the preset adjustment operation on the current active noise reduction parameter includes:

in response to that the current active noise reduction parameters is adjusted, performing the preset adjustment operation on the current active noise reduction parameter by a preset adjustment module, and disabling the preset adjustment module after the adjustment of the current active noise reduction parameter is completed.

In addition, in order to achieve the above purpose, the present application provides a device of active noise reduction for an earphone, including:

a collection module, configured to obtain wearing posture change information of the earphone relative to a wearer;

a determination module, configured to determine whether to adjust a current active noise reduction parameter according to the wearing posture change information; and an adjustment module, configured to perform a preset adjustment operation on the current active noise reduction parameter in response to that the current active noise reduction parameter is adjusted.

In addition, in order to achieve the above purpose, the present application provides an active noise reduction earphone, including:

a memory;

a processor; and a computer program stored in the memory and operable on the processor;

when the computer program is executed by the processor, the steps of the method of active noise reduction for the earphone are realized.

In addition, in order to achieve the above purpose, the present application provides a computer-readable storage medium, storing an active noise reduction program, when the active noise reduction program is executed by a processor, the steps of the method of active noise reduction for the earphone are realized.

The present application provides a method of active noise reduction for an earphone. The wearing posture information of the earphone is obtained through the built-in sensor of the earphone, and then the wearing posture change information of the earphone is obtained relative to the wearer through real-time or preset periodic detection. Secondly, according to the wearing posture change information, the wearing posture change of the earphone is determined relative to the wearer, so as to determine whether to adjust the current active noise reduction parameter. According to the wearing posture change information, if the wearing posture changes greatly, it is determined to adjust the current active noise reduction parameter. If the current active noise reduction parameter is adjusted, a preset adjustment operation is performed on the current active noise reduction parameter. The preset adjustment operation includes fitting degree detection and parameter adjustment. The fitting degree information of the earphone is obtained through the fitting degree detection, and the current active noise reduction parameter is adjusted according to the fitting degree information. The present application realizes the adaptive adjustment of the active noise reduction parameter of the earphone, so as to better fit the user's wearing posture and bring better noise reduction experience.

BRIEF DESCRIPTION OF THE DRAWINGS

The accompanying drawings, which are incorporated in and constitute a part of this description, illustrate embodiments consistent with the present application and together with the description serve to explain the principles of the present application. In order to more clearly illustrate the technical solutions of the embodiments of the present application, the accompanying drawings that need to be used in the description of the embodiments will be briefly introduced below. Obviously, for those skilled in the art, other drawings can be obtained based on these drawings without exerting any creative effort.

Figure 1:
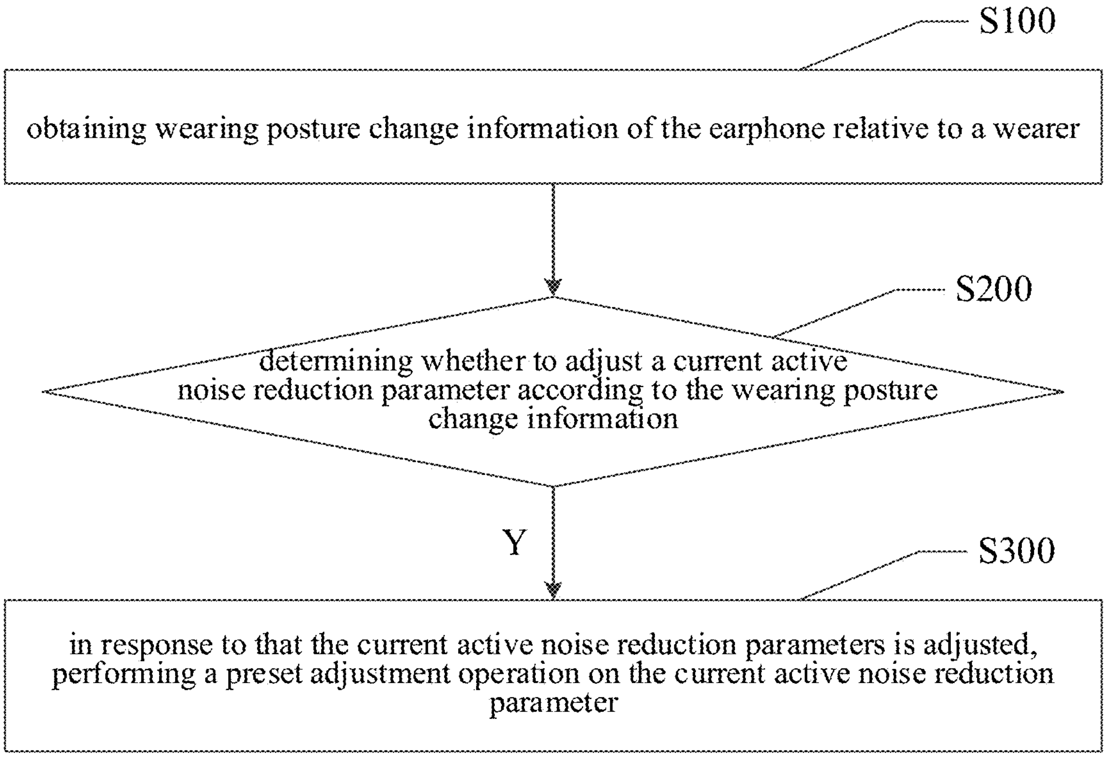
FIG. 1 is a schematic flow diagram of a method of active noise reduction for an earphone according to a first embodiment of the present application.

The realization, functional features and advantages of the present application will be further described in conjunction with the embodiments and with reference to the accompanying drawings. By means of the above drawings, specific embodiments of the present application have been shown, which will be described in more detail hereinafter. These drawings and text descriptions are not intended to limit the scope of the concept of the present application in any way, but to illustrate the concept of the present application for those skilled in the art by referring to specific embodiments.

DETAILED DESCRIPTION OF THE EMBODIMENTS

Reference will now be made in detail to the exemplary embodiments, examples of which are illustrated in the accompanying drawings. When the following description refers to the accompanying drawings, the same numerals in different drawings refer to the same or similar elements unless otherwise indicated. The implementations described in the following exemplary embodiments do not represent all implementations consistent with the present application. Rather, they are merely examples of apparatuses and methods consistent with aspects of the present application as recited in the appended claims.

It should be noted that, in this text, the term "comprising", "including" or any other variation thereof is intended to cover a non-exclusive inclusion such that a process, method, article or apparatus comprising a set of elements includes not only those elements, but also includes other elements not expressly listed, or elements inherent in the process, method, article, or device. Without further limitations, an element defined by the statement "comprising a . . . " does not exclude the presence of other identical elements in the process, method, article, or device that includes the element. In addition, in different implementations of the present application, components, features, and elements with the same name in the example may have the same meaning, or may have different meanings, and the specific meaning shall be determined based on the explanation in the specific embodiment or further combined with the context in the specific embodiment.

It should be understood that although the terms first, second, third, etc. may be used herein to describe various information, such information should not be limited to these terms. These terms are only configured to distinguish information of the same type from one another. For example, without departing from the scope of this text, first information may also be called second information, and similarly, second information may also be called first information. Depending on the context, the word "if" as used herein may be interpreted as "at" or "when" or "in response to determining". Furthermore, as used herein, the singular forms "a", "an" and "the" are intended to include the plural forms as well, unless the context indicates otherwise. It should be further understood that the terms "comprising", "including" indicate the presence of features, steps, operations, elements, components, items, species, and/or groups, but do not exclude the existence, occurrence, or addition of one or more other features, steps, operations, elements, components, items, categories, and/or groups. The terms "or", "and/or", "comprising at least one of" and the like used in the present application may be interpreted as inclusive, or mean any one or any combination. For example, "including at least one of the following: A, B, C" means "any of the following: A; B; C; A and B; A and C; B and C; A and B and C"; for another example, "A, B or C" or "A, B and/or C" means "any of the following: A; B; C; A and B; A and C; B and C; A and B and C". Exceptions to this definition will only arise when combinations of elements, functions, steps or operations are inherently mutually exclusive in some way.

It should be understood that although the various steps in the flow chart in the embodiment of the present application are displayed sequentially as indicated by the arrows, these steps are not necessarily executed sequentially in the order indicated by the arrows. Unless otherwise specified herein, there is no strict order restriction on the execution of these steps, and they can be executed in other orders. Moreover, at least some of the steps in the figure may include multiple sub-steps or multiple stages, these sub-steps or stages are not necessarily executed at the same time, but may be executed at different times, and the execution order is not necessarily sequential. Instead, it may be performed alternately or alternately with at least a part of other steps or sub-steps or stages of other steps.

Depending on the context, the words "if", "in case" as used herein may be interpreted as "at" or "when" or "in response to determining" or "in response to detecting". Similarly, depending on the context, the phrases "if determined" or "if detected (the stated condition or event)" could be interpreted as "when determined" or "in response to the determining" or "when detected (the stated condition or event)" or "in response to detecting (a stated condition or event)".

It should be noted that, in this article, step codes such as S100 and S200 are used, the purpose of which is to express the corresponding content more clearly and concisely, and does not constitute a substantive limitation on the order. Those skilled in the art, during specific implementation, may perform S200 first, followed by S100, etc., but these should be within the protection scope of the present application.

It should be understood that the specific embodiments described here are only configured to explain the present application, and are not intended to limit the present application.

In the following description, the use of suffixes such as "module", "part" or "unit" for denoting elements is only for facilitating the description of the present application and has no specific meaning by itself. Therefore, "module", "part" or "unit" may be mixedly used.

Referring to FIG. 1, the first embodiment of the present application provides a method of active noise reduction for an earphone. The active noise reduction method for earphones includes:

Step S100, obtaining the wearing posture change information of the earphone relative to the wearer;

Specifically, the wearing posture information of the earphone relative to the wearer can be monitored through the built-in sensor of the earphone, for example, the capacitance information (that is, the wearing posture information) of the contact between the earphone and the human ear can be obtained through a capacitive sensor; and then according to the capacitance information, the relative distance information between the earphone and the human ear (that is, the wearing posture information) can also be obtained through an optical sensor (such as an infrared sensor); and the pressure information (that is, the wearing posture information) between the earphone and the human ear can also be obtained through the pressure sensor; and then according to the above wearing posture information, the wearer's posture and tightness of the earphones can be determined. One or more sensors that can be selected can monitor the wearing posture information in real time or preset periodically to obtain the changes in the wearing posture information (that is, the wearing posture change information of the earphone relative to the wearer). The wearing posture change information may include capacitance change information and/or distance change information and/or pressure change information and the like based on the type of sensors selected.

Step S200, determining whether to adjust the current active noise reduction parameters according to the wearing posture change information;

Specifically, the current active noise reduction parameters include current noise reduction filter parameters of the earphone. The wearing posture change information of the earphone can be configured to determine the wearing posture change of the earphone relative to the wearer. If the wearing posture changes greatly, it means that the noise reduction effect of the earphone may be affected at this time, and the current active noise reduction parameters need to be adjusted. Therefore, the corresponding change threshold can be preset according to the type of sensor selected and the corresponding relationship between the information collected by the sensor and the wearing posture. Then, according to the wearing posture change information, based on the preset change threshold, it is determined whether to adjust the current active noise reduction parameters. The form of the preset change threshold is determined by the type of sensor selected. For example, the preset change threshold corresponding to the capacitance sensor is the preset capacitance change threshold. The preset change threshold corresponding to the optical sensor is the preset distance change threshold, and the preset change threshold corresponding to the pressure sensor is the preset pressure change threshold or the like. For example, the optical sensor monitors the relative distance between the earphone and the human ear, and then obtains the distance change value of the relative distance, and determines whether the distance change value exceeds the preset distance change threshold; if it exceeds the preset distance change threshold, it is determined that the current active noise reduction parameters are adjusted; if the preset change threshold is not exceeded, it is determined not to adjust the current active noise reduction parameters.

Step S300, if the current active noise reduction parameters are adjusted, performing a preset adjustment operation on the current active noise reduction parameters.

Specifically, the current active noise reduction parameter includes the current noise reduction filter parameter of the earphone, and the preset adjustment operation may include fitting degree detection and parameter adjustment. If the current active noise reduction parameters are adjusted, the preset fitting degree detection operation can be performed to obtain fitting degree information, and the current noise reduction filter parameters of the earphone can be adjusted according to the fitting degree information. The fitting degree detection operation may be to determine the fitting degree information through the acoustic leakage information, and the acoustic leakage information may be the residual noise information leaked from the external environment noise into the cavity formed by the earphone and the human ear, or it may be the leakage information of the preset test audio output by the earphones. For example, the feedforward microphone and the feedback microphone can obtain the residual noise of the external environmental noise in the cavity formed by the earphone and the human ear, thereby determining the fitting degree information of the earphone. It may also be possible to collect the preset test audio output from a preset speaker in the cavity formed by the earphone and the human ear through a microphone. The preset test audio output by the speaker is compared with the collected audio information to obtain the acoustic leakage information of the preset test audio output by the speaker, so as to determine the fitting degree information of the earphone. After the fitting degree information is obtained, the current noise reduction filter parameters of the earphone are adjusted according to the fitting degree information, so as to compensate for the loss of sound waves in the corresponding frequency band caused by the change of fitting degree.

In another embodiment, step S300 also includes the following steps:

Step A, if the current active noise reduction parameters are adjusted, the preset adjustment module is enabled to perform preset adjustment operations on the current active noise reduction parameters, and the preset adjustment module is disabled after the adjustment of the current active noise reduction parameters is completed.

Specifically, because the adjustment module that performs preset adjustment operations often needs to continuously collect and process audio information, the energy consumption is relatively high. If it is continuously turned on, the battery life of the earphone may be greatly shortened. If and only if the current active noise reduction parameters are adjusted, the preset adjustment module is enabled to perform preset adjustment operations on the current active noise reduction parameters, and the preset adjustment module is disabled after the current active noise reduction parameters are adjusted to reduce the overall energy consumption of the earphone and improve the battery life of the earphone.

In the first embodiment of the present application, the wearing posture information of the earphone can be obtained through the built-in sensor of the earphone, and then the wearing posture change information of the earphone relative to the wearer can be obtained through real-time or preset periodic detection. Secondly, according to the wearing posture change information, the wearing posture change of the earphone is determined relative to the wearer, so as to determine whether to adjust the current active noise reduction parameters. According to the wearing posture change information, if the wearing posture changes greatly, it is determined to adjust the current active noise reduction parameters. If the current active noise reduction parameters are adjusted, a preset adjustment operation is performed on the current active noise reduction parameters. The preset adjustment operation includes fitting degree detection and parameter adjustment. The fitting degree information of the earphone is obtained through the fitting degree detection, and the current active noise reduction parameters are adjusted according to the fitting degree information. This embodiment realizes the adaptive adjustment of the active noise reduction parameters of the earphone, so as to better fit the user's wearing posture and bring better noise reduction experience.

Figure 2:
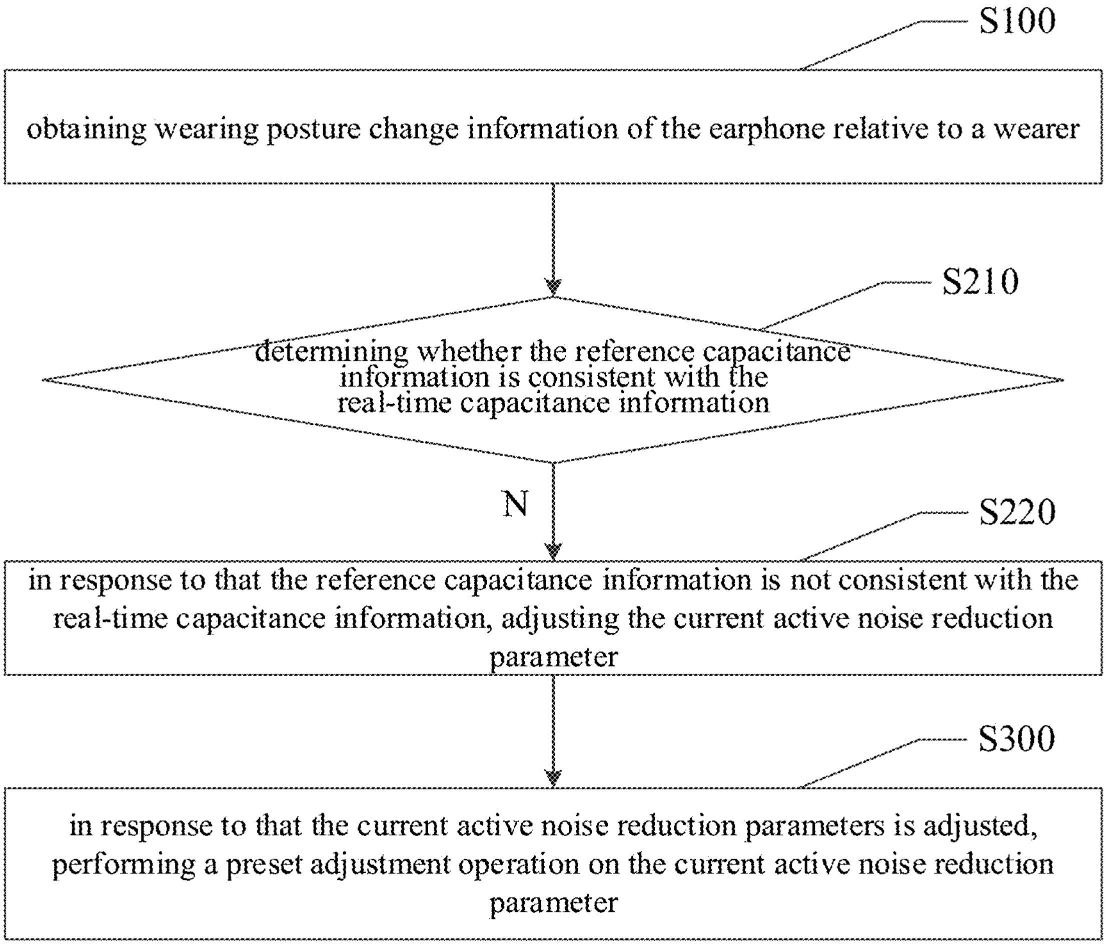
FIG. 2 is a schematic flow diagram of the method of active noise reduction for the earphone according to a second embodiment of the present application.

Further, referring to FIG. 2, the second embodiment of the present application provides a method of active noise reduction for an earphone. Based on the above-mentioned embodiment shown in FIG. 1, the wearing posture change information includes reference capacitance information and real-time capacitance information, and step S200 includes the following steps:

Step S210, determining whether the reference capacitance information is consistent with the real-time capacitance information;

Step S220, if not consistent, it is determined to adjust the current active noise reduction parameters.

Specifically, the wearing posture change information includes reference capacitance information and real-time capacitance information. Real-time capacitance information can be obtained through the capacitance sensor, by comparing the reference capacitance information with the real-time capacitance information. The reference capacitance information is the capacitance information corresponding to the wearing posture of the current active noise reduction parameters. The real-time capacitance information is the capacitance information monitored in real time by the built-in capacitance sensor of the earphone. The reference capacitance information includes a reference capacitance value, and the real-time capacitance information includes a real-time capacitance value. It can be determined whether the difference between the reference capacitance value and the real-time capacitance value exceeds the preset capacitance threshold; if it exceeds the preset capacitance threshold, it is determined that the reference capacitance information is inconsistent with the real-time capacitance information; if it does not exceed the preset capacitance threshold, it is determined that the reference capacitance information is consistent with the real-time capacitance information. When the reference capacitance information is inconsistent with the real-time capacitance information, it means that the wearing posture of the earphone has changed greatly, and it is determined to adjust the current active noise reduction parameters; when the reference capacitance information is consistent with the real-time capacitance information, it means that the wearing posture of the earphone has changed little, it is determined not to adjust the current active noise reduction parameters. In this embodiment, the real-time capacitance information generated by the contact between the earphone and the human ear is collected through the capacitive sensor; and then it is determined whether to adjust the current active noise reduction parameters by comparing the reference capacitance information with the real-time capacitance information. The sensor quickly confirms the change of the wearing posture of the earphone, so as to determine whether the current active noise reduction parameters need to be adjusted, thereby avoiding the problem of high energy consumption caused by real-time adjustment of the active noise reduction parameters, and improving the battery life of the earphone.

In another embodiment, the reference capacitance information includes a reference capacitance value, and the real-time capacitance information includes a real-time capacitance value. Step S210 also includes:

Step S211, determining whether the reference capacitance value and the real-time capacitance value are in the same preset capacitance range;

Step S212, if the reference capacitance value and the real-time capacitance value are in the same preset capacitance range, it is determined that the reference capacitance information is consistent with the real-time capacitance information;

In step S213, if the reference capacitance value and the real-time capacitance value are not in the same preset capacitance range, it is determined that the reference capacitance information is inconsistent with the real-time capacitance information.

Specifically, the reference capacitance information includes a reference capacitance value, and the real-time capacitance information includes a real-time capacitance value. Multiple continuous capacitance ranges can be preset, and each capacitance range can correspond to the wearing posture (such as the tightness of wearing), and it is determine that whether the reference capacitance value and the real-time capacitance value are in the same preset capacitance range; if they are in the same preset capacitance range, it is indicated that the wearing posture has not changed greatly, then it is determined that the reference capacitance information is consistent with the real-time capacitance information; if it is not in the same preset capacitance range, it means that the wearing posture has changed greatly, then it is determined that the reference capacitance information is inconsistent with the real-time capacitance information. In this embodiment, by presetting a plurality of continuous capacitance ranges, each capacitance range can correspond to a wearing posture, so as to determine whether the reference capacitance value and the real-time capacitance value are in the same preset capacitance range to determine whether the reference capacitance information and the real-time capacitance information are consistent, so as to quickly determine the wearing posture change information.

Figure 3:
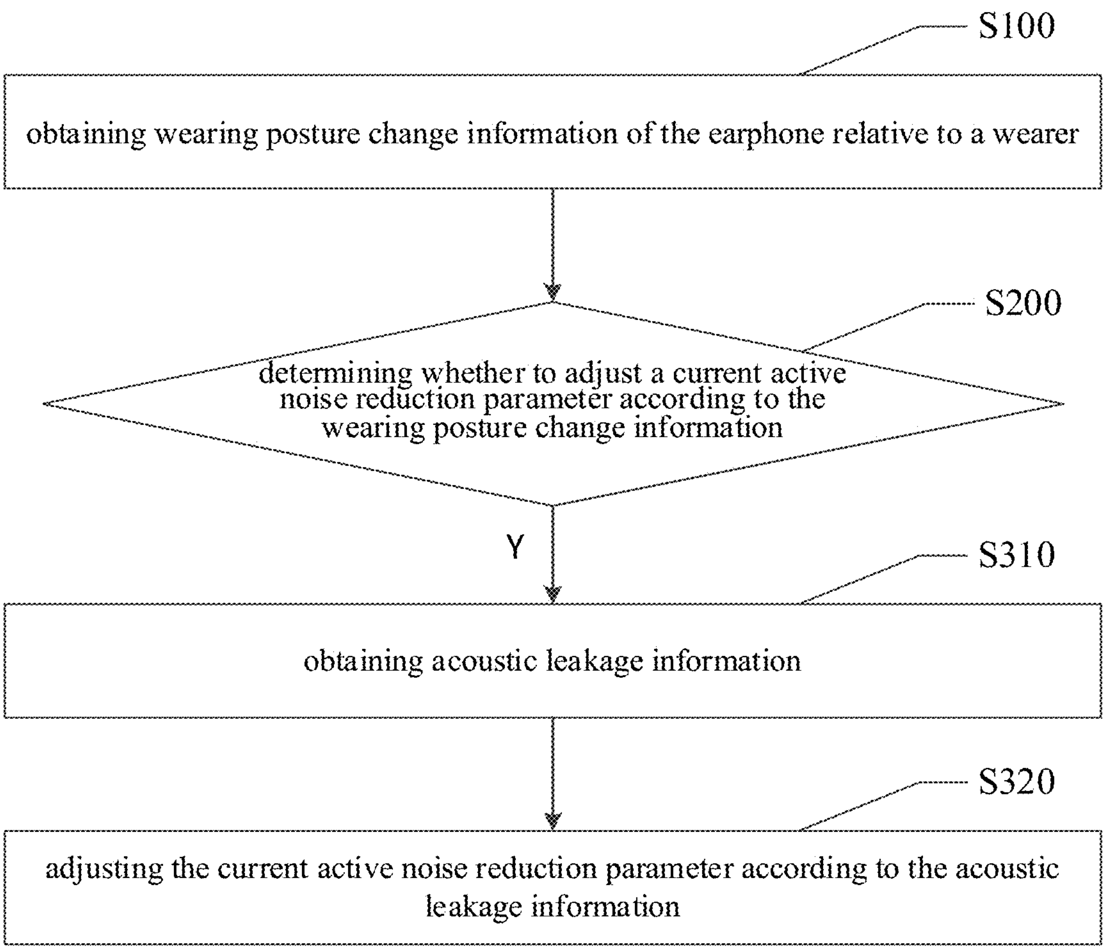
FIG. 3 is a schematic flow diagram of the method of active noise reduction for the earphone according to a third embodiment of of the present application.

Further, referring to FIG. 3, the third embodiment of the present application provides a method of active noise reduction for an earphone. Based on the above-mentioned embodiment shown in FIG. 1, step S300 includes the following steps:

Step S310, obtaining acoustic leakage information;

Step S320, adjusting current active noise reduction parameters according to the acoustic leakage information.

Specifically, the acoustic leakage information may be residual noise information leaked from external environmental noise into the cavity formed by the earphone and the human ear, or may be leakage information of preset test audio output by the earphone. For example, the feedforward microphone and the feedback microphone obtain the residual noise of the external environment noise in the cavity formed by the earphone and the human ear; or a microphone is configured to collect the preset test audio output from the preset speaker in the cavity formed by the earphones and the human ear. The audio information collected is compared with the preset test audio to obtain the leakage information of the preset test audio. Therefore, according to the acoustic leakage information, the current noise reduction filter parameters of the earphone are adjusted to compensate for the loss of sound waves in the corresponding frequency band caused by the change of the fitting degree.

Step S310 includes the following steps:

Step S311, obtaining the first audio information, and obtaining the second audio information after the first audio information is propagated, the first audio information is formed by superposition of acoustic signals in a preset frequency band;

Step S312, generating acoustic leakage information according to the first audio information and the second audio information.

Specifically, the first audio information is a preset test audio signal formed by superimposing acoustic signals in a preset frequency band. The first audio information can be output through the preset speaker of the earphone, and then the audio information after the first audio information propagates through the cavity formed by the earphone and the human ear is collected by the preset microphone of the earphone as the second audio information. By filtering the first audio information and the second audio information, the amplitude loss and/or displacement of the first audio information at different frequency bands (that is, acoustic leakage information) is obtained.

The acoustic leakage information includes the amplitude loss and/or displacement of the acoustic signal in the preset frequency band, and step S320 includes the following steps:

Step S321, according to the amplitude loss and/or displacement of the acoustic signal in the preset frequency band, obtaining the compensation information for the acoustic signal in the preset frequency band;

Step S322, adjusting the current active noise reduction parameters according to the compensation information, so as to compensate the acoustic signal in the preset frequency band.

Specifically, the compensation information includes sound wave compensation information in a preset frequency band. According to the amplitude loss and/or displacement of the acoustic signal in the preset frequency band, the compensation information for the acoustic signal in the preset frequency band is obtained; according to the compensation information, the current active noise reduction parameters include the current noise reduction filter parameters of the earphone to compensate the corresponding loss of sound waves in the preset frequency band, thereby making the output noise reduction audio signal more suitable for the user's current wearing posture.

Figure 4:
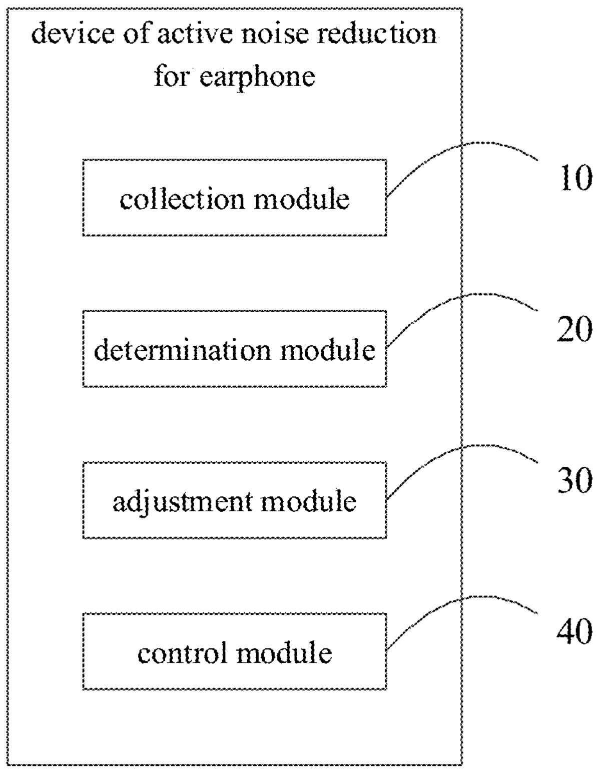
FIG. 4 is a schematic structural diagram of a device of active noise reduction for an earphone according to an embodiment of the present application.

As shown in FIG. 4, FIG. 4 is a schematic structural diagram of an active noise reduction device for an earphone related to the solution of the embodiment of the present application.

An embodiment of the present application provides an active noise reduction device for earphones, and the active noise reduction device includes:

a collection module 10, configured for obtaining the wearing posture change information of earphone relative to wearer;

a determination module 20, configured to determine whether to adjust the current active noise reduction parameters according to the wearing posture change information;

an adjustment module 30, configured to perform a preset adjustment operation on the current active noise reduction parameter if the current active noise reduction parameter is adjusted.

Furthermore, the wearing posture change information includes reference capacitance information and real-time capacitance information, and the active noise reduction device also includes:

The determination module 20, also configured to determine whether the reference capacitance information is consistent with the real-time capacitance information;

The determination module 20 is further configured to determine to adjust the current active noise reduction parameters if they are inconsistent.

Furthermore, the reference capacitance information includes a reference capacitance value, the real-time capacitance information includes a real-time capacitance value, and the active noise reduction device also includes:

The determination module 20, also configured to determine whether the reference capacitance value and the real-time capacitance value are in the same preset capacitance range;

The determination module 20, also configured to determine that the reference capacitance information is consistent with the real-time capacitance information if they are in the same preset capacitance range;

The determination module 20, further configured to determine that the reference capacitance information is inconsistent with the real-time capacitance information if they are not in the same preset capacitance range.

Furthermore, the active noise reduction device also includes:

The adjustment module 30, also configured to acquire acoustic leakage information;

The adjustment module 30, further configured to adjust current active noise reduction parameters according to the acoustic leakage information.

Furthermore, the active noise reduction device also includes:

The adjustment module 30, also configured to obtain the first audio information, and obtain the second audio information after the first audio information is propagated; the first audio information is formed by superposition of acoustic signals in a preset frequency band;

The adjustment module 30, further configured to generate acoustic leakage information according to the first audio information and the second audio information.

Furthermore, the acoustic leakage information includes the amplitude loss and/or displacement of the acoustic signal in the preset frequency band, and the active noise reduction device also includes:

The adjustment module 30, also configured to obtain compensation information for the acoustic signal in the preset frequency band according to the amplitude loss and/or displacement of the acoustic signal in the preset frequency band;

The adjustment module 30, further configured to adjust the current active noise reduction parameters according to the compensation information, so as to compensate the acoustic signal in the preset frequency band.

Furthermore, the active noise reduction device also includes: a control module 40;

The control module 40 is configured to enable the preset adjustment module 30 to perform a preset adjustment operation on the current active noise reduction parameter if the current active noise reduction parameter is adjusted, and disable the preset adjustment module 30 after the current active noise reduction parameter is adjusted.

Figure 5:
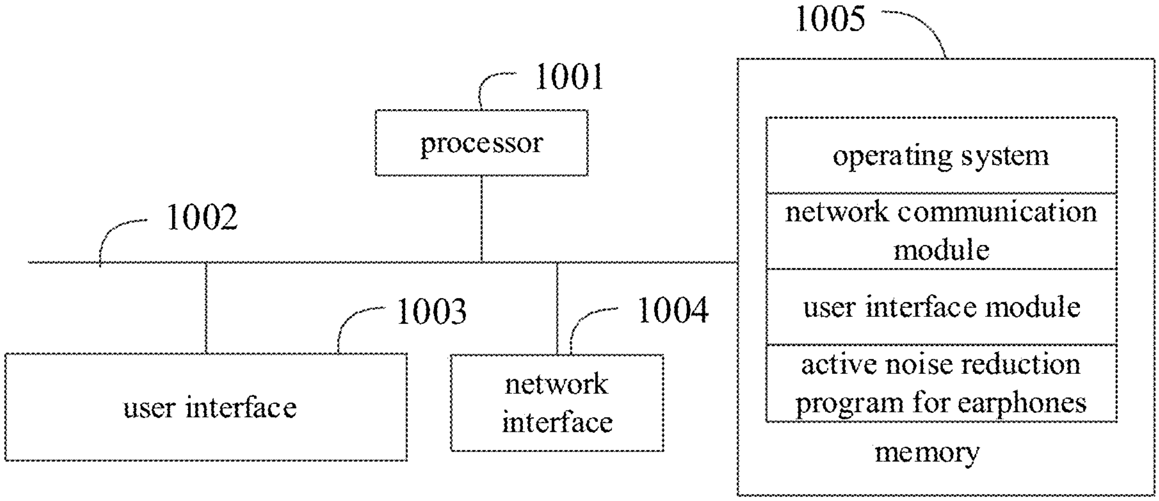
FIG. 5 is a schematic structural diagram of an active noise reduction earphone in a hardware operating environment according to an embodiment of the present application.

As shown in FIG. 5, FIG. 5 is a schematic structural diagram of an active noise reduction earphone in a hardware operating environment according to an embodiment of the present application.

The embodiment of the present application also provides an active noise reduction earphone. The active noise reduction earphone can be a wireless earphone (such as an in-ear, semi-in-ear or head-mounted TWS earphone, etc.) or a wired earphone.

As shown in FIG. 5, the active noise reduction earphone may include: a processor 1001, such as a CPU, a network interface 1004, a user interface 1003, a memory 1005, and a communication bus 1002. The communication bus 1002 is configured to realize connection and communication between these components. The user interface 1003 may include a display screen, an input unit such as a keyboard, and the optional user interface 1003 may also include a standard wired interface and a wireless interface. Optionally, the network interface 1004 may include a standard wired interface and a wireless interface (such as a WI-FI interface). The memory 1005 can be a high-speed RAM memory, or a stable memory (non-volatile memory), such as a disk memory. Optionally, the memory 1005 may also be a storage device independent of the aforementioned processor 1001.

Optionally, the active noise reduction earphone may also include an audio output module, an audio collection module, a sensor, a WiFi module, a Bluetooth module, a control module, and the like. Among them, sensors such as light sensors, motion sensors and other sensors. Specifically, the light sensor may include an ambient light sensor and a proximity sensor. As a kind of motion sensor, the gravitational acceleration sensor can detect the magnitude of acceleration in various directions (generally three axes), and can detect the magnitude and direction of gravity when it is stationary, and can be configured to identify the posture and vibration recognition related functions of the device (such as pacing, tapping), etc.; of course, other sensors such as gyroscopes, barometers, hygrometers, thermometers, optical line sensors, etc. can also be configured, which are not repeated here.

Those skilled in the art can understand that the structure of the active noise reduction earphones shown in FIG. 5 does not constitute a limitation on the active noise reduction earphones. It may include more or less components than shown in the figure, or some components may be combined or different component layout.

As shown in FIG. 5, the memory 1005 as a computer storage medium may include an operating system, a network communication module, a user interface module, and an active noise reduction application program.

In the device shown in FIG. 5, the processor 1001 can be configured to call the active noise reduction program stored in the memory 1005, and perform the following operations:

obtaining wearing posture change information of the earphone relative to the wearer;

determining whether to adjust the current active noise reduction parameters according to the wearing posture change information;

performing a preset adjustment operation on the current active noise reduction parameter, if the current active noise reduction parameter is adjusted.

Furthermore, the wearing posture change information includes reference capacitance information and real-time capacitance information, and the processor 1001 can also be configured to call the active noise reduction program stored in the memory 1005, and perform the following operations:

determining whether the reference capacitance information is consistent with the real-time capacitance information;

if not, it is determined to adjust the current active noise reduction parameters.

Furthermore, the reference capacitance information includes a reference capacitance value, and the real-time capacitance information includes a real-time capacitance value. The processor 1001 can also be configured to call the active noise reduction program stored in the memory 1005, and perform the following operations:

determining whether the reference capacitance value and the real-time capacitance value are in the same preset capacitance range;

if they are in the same preset capacitance range, it is determined that the reference capacitance information is consistent with the real-time capacitance information;

if they are not in the same preset capacitance range, it is determined that the reference capacitance information is inconsistent with the real-time capacitance information.

Furthermore, the processor 1001 can also be configured to call the active noise reduction program stored in the memory 1005, and perform the following operations:

obtaining acoustic leakage information;

adjusting the current active noise reduction parameters according to the acoustic leakage information.

Furthermore, the processor 1001 can also be configured to call the active noise reduction program stored in the memory 1005, and perform the following operations:

obtaining first audio information, and obtaining second audio information after the first audio information is propagated; the first audio information is formed by superimposing acoustic signals in preset frequency bands;

generating acoustic leakage information based on the first audio information and the second audio information.

Furthermore, the acoustic leakage information includes the amplitude loss and/or displacement of the acoustic signal in a preset frequency band, and the processor 1001 can also be configured to call the active noise reduction program stored in the memory 1005, and perform the following operations:

obtaining compensation information for the acoustic signal in the preset frequency band according to the amplitude loss and/or displacement of the acoustic signal in the preset frequency band;

according to the compensation information, adjusting the current active noise reduction parameters to compensate the acoustic signal in the preset frequency band.

Furthermore, the processor 1001 can also be configured to call the active noise reduction program stored in the memory 1005, and perform the following operations:

if the current active noise reduction parameters are adjusted, the preset adjustment module is enabled to perform a preset adjustment operation on the current active noise reduction parameters, and the preset adjustment module is enabled after the adjustment of the current active noise reduction parameters is completed.

In addition, the embodiment of the present application also provides a computer storage medium.

A computer program is stored on the computer storage medium, and when the computer program is executed by the processor, the operations in the method of active noise reduction for the earphone provided in the foregoing embodiments are implemented.

It can be understood that the above scenario is only an example, and does not constitute a limitation on the present application scenario of the technical solution provided by the embodiment of the present application, and the technical solution of the present application can also be applied to other scenarios. For example, those skilled in the art know that with the evolution of the system architecture and the emergence of new business scenarios, the technical solutions provided in the embodiments of the present application are also applicable to similar technical problems.

The serial numbers of the above embodiments of the present application are for description only, and do not represent the advantages and disadvantages of the embodiments.

The steps in the methods of the embodiments of the present application can be adjusted, combined and deleted according to actual needs.

Units in the device in the embodiment of the present application may be combined, divided and deleted according to actual needs.

In the present application, descriptions of the same or similar terms, concepts, technical solutions and/or application scenarios are generally only described in detail when they appear for the first time, and when they appear repeatedly later, for the sake of brevity, they are generally not repeated. When understanding the technical solutions and other contents of the present application, for the same or similar term concepts, technical solutions and/or application scenario descriptions that are not described in detail later, you can refer to the previous relevant detailed descriptions.

In the present application, the description of each embodiment has its own emphasis. For the parts that are not detailed or recorded in a certain embodiment, please refer to the relevant descriptions of other embodiments.

The various technical features of the technical solution of the present application can be combined arbitrarily. For the sake of concise description, all possible combinations of the various technical features in the above-mentioned embodiments are not described. However, as long as there is no contradiction in the combination of these technical features, they should be regarded as the scope described in the present application.

Through the description of the above embodiments, those skilled in the art can clearly understand that the methods of the above embodiments can be implemented by means of software plus a necessary general-purpose hardware platform, and of course also by hardware, but in many cases the former is better implementation. Based on this understanding, the technical solution of the present application can be embodied in the form of a software product in essence or in other words, the part that contributes to the related art, and the computer software product is stored in one of the above storage media (such as ROM/RAM, magnetic CD, CD), including several instructions to make a terminal device (which may be a mobile phone, computer, server, controlled terminal, or network device, etc.) execute the method of each embodiment of the present application.

In the above embodiments, all or part of them may be implemented by software, hardware, firmware or any combination thereof. When implemented using software, it may be implemented in whole or in part in the form of a computer program product. A computer program product includes one or more computer instructions. When the computer program instructions are loaded and executed on the computer, the processes or functions according to the embodiments of the present application will be generated in whole or in part. A computer can be a general purpose computer, special purpose computer, a computer network, or other programmable apparatus. Computer instructions can be stored in or transmitted from one computer-readable storage medium to another computer-readable storage medium, for example, computer instructions can be sent from a website site, computer, server or data center by wire (such as coaxial cable, optical fiber, digital subscriber line) or wireless (such as optical, wireless, microwave, etc.) to another website site, computer, server or data center. The computer-readable storage medium may be any available medium that can be accessed by a computer, or a data storage device such as a server, a data center, etc. integrated with one or more available media. Usable media may be magnetic media, (eg, floppy disk, memory disk, magnetic tape), optical media (eg, DVD), or semiconductor media (eg, solid state disk (SSD)).

The above are only some embodiments of the present application, and are not intended to limit the patent scope of the present application. All equivalent structures or equivalent process transformations made by using the description of the present application and the accompanying drawings, directly or indirectly used in other related technical fields, are all included in the protection scope of the present application in the same way.

What is claimed is:

1. A method of active noise reduction for an earphone, comprising:

obtaining wearing posture change information of the earphone relative to a wearer;

determining whether to adjust a current active noise reduction parameter according to the wearing posture change information; and in response to that the current active noise reduction parameters are adjusted, performing a preset adjustment operation on the current active noise reduction parameter;

wherein the wearing posture change information comprises reference capacitance information and real-time capacitance information;

the determining whether to adjust the current active noise reduction parameter according to the wearing posture change information comprises:

determining whether the reference capacitance information is consistent with the real-time capacitance information, wherein the reference capacitance information is capacitance information corresponding to a wearing posture of the current active noise reduction parameter; the real-time capacitance information is capacitance information monitored in real time by a built-in capacitance sensor of the earphone; and in response to that the reference capacitance information is not consistent with the real-time capacitance information, adjusting the current active noise reduction parameter;

wherein the reference capacitance information comprises a reference capacitance value, and the real-time capacitance information comprises a real-time capacitance value;

the determining whether the reference capacitance information is consistent with the real-time capacitance information comprises:

determining whether the reference capacitance value and the real-time capacitance value are in a same preset capacitance range, wherein each preset capacitance range corresponds to a wearing tightness level of the wearing posture;

in response to that the reference capacitance value and the real-time capacitance value are in the same preset capacitance range, determining that the reference capacitance information is consistent with the real-time capacitance information; and in response to that the reference capacitance value and the real-time capacitance value are not in the same preset capacitance range, determining that the reference capacitance information is inconsistent with the real-time capacitance information;

wherein the performing the preset adjustment operation on the current active noise reduction parameter comprises:

obtaining acoustic leakage information; and adjusting the current active noise reduction parameter according to the acoustic leakage information;

wherein the acoustic leakage information comprises an amplitude loss and a displacement of the acoustic signal in a preset frequency band;

the adjusting the current active noise reduction parameter according to the acoustic leakage information comprises:

obtaining compensation information for the acoustic signal in the preset frequency band according to the amplitude loss and the displacement of the acoustic signal in the preset frequency band; and adjusting the current active noise reduction parameter to compensate the acoustic signal in the preset frequency band according to the compensation information.

2. The method of active noise reduction for the earphone according to claim 1, wherein the obtaining the acoustic leakage information comprises:

obtaining first audio information, and obtaining second audio information after the first audio information is propagated, wherein the first audio information is formed by superposition of acoustic signals in a preset frequency band; and generating the acoustic leakage information according to the first audio information and the second audio information.

3. The method of active noise reduction for the earphone according to claim 1, wherein the in response to that the current active noise reduction parameters is adjusted, performing the preset adjustment operation on the current active noise reduction parameter comprises:

in response to that the current active noise reduction parameters is adjusted, performing the preset adjustment operation on the current active noise reduction parameter by a preset adjustment module, and disabling the preset adjustment module after the adjustment of the current active noise reduction parameter is completed.

4. An active noise reduction earphone, comprising:

a memory;

a processor; and a computer program stored in the memory and operable on the processor;

wherein when the computer program is executed by the processor, the steps of the method of active noise reduction for the earphone according to claim 1 are realized.

5. A non-transitory computer-readable storage medium, storing an active noise reduction program, wherein when the active noise reduction program is executed by a processor, the steps of the method of active noise reduction for the earphone according to claim 1 are realized.

6. A device of active noise reduction for an earphone, comprising:

a collection module, configured to obtain wearing posture change information of the earphone relative to a wearer;

a determination module, configured to determine whether to adjust a current active noise reduction parameter according to the wearing posture change information; and an adjustment module, configured to perform a preset adjustment operation on the current active noise reduction parameter in response to that the current active noise reduction parameter is adjusted;

wherein the wearing posture change information comprises reference capacitance information and real-time capacitance information;

the determination module being configured to determine whether to adjust the current active noise reduction parameter according to the wearing posture change information comprises:

the determination module being configured to determine whether the reference capacitance information is consistent with the real-time capacitance information, wherein the reference capacitance information is capacitance information corresponding to a wearing posture of the current active noise reduction parameter; the real-time capacitance information is capacitance information monitored in real time by a built-in capacitance sensor of the earphone; and in response to that the reference capacitance information is not consistent with the real-time capacitance information, the determination module being configured to adjust the current active noise reduction parameter;

wherein the reference capacitance information comprises a reference capacitance value, and the real-time capacitance information comprises a real-time capacitance value;

the determination module being configured to determine whether the reference capacitance information is consistent with the real-time capacitance information comprises:

the determination module being configured to determine whether the reference capacitance value and the real-time capacitance value are in a same preset capacitance range, wherein each preset capacitance range corresponds to a wearing tightness level of the wearing posture;

in response to that the reference capacitance value and the real-time capacitance value are in the same preset capacitance range, the determination module being configured to determine that the reference capacitance information is consistent with the real-time capacitance information; and in response to that the reference capacitance value and the real-time capacitance value are not in the same preset capacitance range, the determination module being configured to determine that the reference capacitance information is inconsistent with the real-time capacitance information;

wherein the adjustment module being configured to perform the preset adjustment operation on the current active noise reduction parameter comprises:

the adjustment module being configured to obtain acoustic leakage information; and the adjustment module being configured to adjust the current active noise reduction parameter according to the acoustic leakage information;

wherein the acoustic leakage information comprises an amplitude loss and a displacement of the acoustic signal in a preset frequency band;

the adjustment module being configured to adjust the current active noise reduction parameter according to the acoustic leakage information comprises:

the adjustment module being configured to obtain compensation information for the acoustic signal in the preset frequency band according to the amplitude loss and the displacement of the acoustic signal in the preset frequency band; and the adjustment module being configured to adjust the current active noise reduction parameter to compensate the acoustic signal in the preset frequency band according to the compensation information.

* * * * *